United States Patent [19]

McNally et al.

[11] 4,084,083
[45] Apr. 11, 1978

[54] MULTI-AXIS ELECTRONIC MOTION GENERATOR

[75] Inventors: Paul F. McNally, Gibsonia; Robert G. Burig, Allison Park, both of Pa.

[73] Assignee: Contraves Goerz Corporation, Pittsburgh, Pa.

[21] Appl. No.: 629,029

[22] Filed: Nov. 5, 1975

[51] Int. Cl.$^2$ ............................................. G05B 19/18
[52] U.S. Cl. ............................... 364/118; 214/1 CM; 318/569; 318/625; 340/347 M; 340/347 SY
[58] Field of Search .................. 340/347 SY, 347 P; 318/51, 85, 162, 560–574, 625, 660; 235/151.11, 152; 214/1 CM

[56] References Cited

U.S. PATENT DOCUMENTS

| | | | |
|---|---|---|---|
| 3,439,346 | 4/1969 | McGee | 235/151.11 |
| 3,504,362 | 3/1970 | Feldmann | 340/347 SY |
| 3,731,301 | 5/1973 | Davis | 340/347 P |
| 3,757,188 | 9/1973 | Brewer et al. | 318/162 X |
| 3,818,301 | 6/1974 | Sindelar | 318/625 X |
| 3,851,330 | 11/1974 | Huber | 340/347 SY |
| 3,906,194 | 9/1975 | Fairbairn | 340/347 P X |
| 3,918,045 | 11/1975 | Morser et al. | 340/347 SY |
| 3,951,271 | 4/1976 | Mette | 214/1 CM |

OTHER PUBLICATIONS

Barker, "A Servo System for Digital Data Transmission," Proc. of the I.E.E., vol. 103, Jan. 1956, pp. 52–64.

*Primary Examiner*—Thomas J. Sloyan
*Attorney, Agent, or Firm*—Robert D. Yeager; Howard G. Massung

[57] ABSTRACT

Apparatus for generating synchronized multi-axis intermittent motion utilizing electronic encoding, memory and a servo controlled positioning system. A plurality of mechanically independent slave shafts are positioned in response to the position of a rotatable master shaft. An analog transducer is attached to the master shaft providing an analog output signal which is fed through an analog-to-digital converter. A digital representation of the master shaft position is provided by the analog-to-digital converter. The digital indication of master shaft position is fed to a plurality of independent digital memory devices each of which provides, in response, a digital position signal indicative of the desired position of an associated slave shaft. The output of each independent digital memory device is fed to a digital-to-analog converter which provides an analog output representative of the desired slave shaft position. A servo controller positions the associated slave shaft in response to the analog signal. A translator can be utilized for combining the digital output of each memory with an analog position signal from a position transducer connected to the associated slave shaft and providing an analog difference or error signal which can be utilized for proper positioning of the slave shaft. A tachometer can be utilized in the slave shaft servo for providing speed feedback information. Other means for speed feedback can be employed either by deriving a speed signal from other parameters, related to speed, or by utilizing the characteristics of the prime mover itself for speed feedback.

21 Claims, 5 Drawing Figures

MULTI-AXIS ELECTRONIC MOTION GENERATOR

CROSS REFERENCE TO RELATED APPLICATIONS

This application is related to copending Application Ser. No. 655,072 entitled Feed Forward Control of an Electronic Profile Generator.

BACKGROUND OF THE INVENTION

1. Field of the Invention

This invention relates to apparatus for controlling a plurality of output shafts and more particularly to an electronic motion generator for positioning a plurality of slave shafts in response to a master axis motion input.

2. Description of the Prior Art

In drive control, a profile is the description of the operation or movement of a motion drive, usually expressed as a time versus location curve for one full cycle of the drive. That is, the control profile is a description of how the output position of a slave follows the master input position. The slaves are usually driven mechanically by gears, cams, levers, chains, belts, or the like. The main drive shafts are driven through many cycles, and the slave shafts follow their profile position through each cycle to accomplish multi-step operations such as assembling, testing, or packing various items. The speed of the main drive shaft can vary and the speed and positioning of the associated slave shafts must also vary accordingly.

Conventional prior art mechanical drive controls provide power takeoff for each motion drive from a main mechanical line shaft. A heavy machine support base is required to maintain alignment of the line shaft and power takeoffs. Many mechanical components with inherent friction and inertia are required, resulting in drive power waste. Machine timing is difficult to set or change and the high mechanical wear rate tends to alter timing. It is difficult to alter motion amplitude, velocity, or acceleration, and such changes require installation of change parts such as new gears, sprockets, cams or the like. Mechanical over load clutches are required for torque control.

SUMMARY OF THE INVENTION

An electronically controlled position generator for positioning a plurality of mechanically independent slave shafts in response to the position of a rotatable master shaft. An analog transducer providing a high accuracy analog indicator of the master shaft position feeds an analog-to-digital converter. The analog-to-digital converter provides a highly accurate digital representation of the master shaft position. The output of the analog-to-digital converter is utilized to activate a plurality of independent digital memory devices which provide a digital output signal representing the desired position of an associated slave shaft. That is, the memory devices provide a desired position indication with respect to the master shaft position. The digital signals from the digital memory devices are fed to digital-to-analog converters, the outputs of which control servo systems for positioning the slave shaft axis. The servo system utilized for positioning the slave shaft can by any type of servo controlled positioning system wherein output position is compared to commanded position with a resultant difference signal being applied to a prime mover via an amplifier or other power conversion or control device. The prime mover can be an electric motor, hydraulic motor, gasoline engine, or the like. The power conversion or control device can be an electronic amplifier, a motor generator set, a hydraulic flow control valve, or the like, or a combination of the above.

The disclosed system provides programmable slave axis motion which is synchronized to a master axis, by way of the master analog-to-digital converter or encoder. The master axis encoder provides a digital output representation of the actual master axis position. The digital output is absolute and non-ambiguous over one complete cycle of the memory device. In general, one complete cycle of the memory device would correspond to one revolution of the master axis. The relationship of one cycle per revolution of the master can be altered to suit the requirements of a particular machine or process by adding mechanical gearing or otherwise providing a ratio between the master shaft and the master encoder such that one cycle of the memory device corresponds to more or less than one revolution of the master shaft. In all cases however, the absolute nature of the system is maintained over one complete profile cycle. The same type of absolute control is provided via mechanical cams which act as mechanical memory devices where information is stored via the machining or construction process of the cam profile. Mechanical cams are also absolute over one cycle of their stored profile. Each independent memory device contains the desired positions of its associated slave shaft in reference to the position of the master axis drive. That is, the positions stored in memory are used to control motion of the various slave axes. The desired slave shaft position or profile can be altered by changing data stored in the memory device. The output of the memory device is a discreet stored command word for each input address. The output of the memory device through a digital-to-analog converter controls a servo system in which the motion follows the profile stored in the memory device and does it synchronous with the master axis position. As the master shaft is rotated through many revolutions, the slave shafts are faithfully moved to the positions stored in the memory devices. The slave shafts are normally mechanically independent, but operationally related. That is, they will usually be driving apparatus which performs sequential functions on an item. The operations can be assembly, testing, packing, or the like.

The servo controller positions the associated slave shaft in response to the analog signal. A tachometer may be utilized in the slave shaft servo for providing speed feedback information. Other means for speed feedback can be employed either by deriving a speed signal from other parameters related to speed or by utilizing the characteristics of the prime mover itself for speed feedback.

One example of a derived speed signal would occur in the case where the speed of a DC motor is computed by subtracting the armature resistance drop from the applied armature voltage thus obtaining motor back electro motive force (BEMF) which is directly related to motor speed by a constant.

An example of utilizing the characteristics of the prime mover itself for speed feedback would be the use of a DC motor where the motor runs at a speed proportional to the applied voltage. The only error results from the armature resistance drop which in many cases is small enough to be neglected. A block diagram for a DC motor indeed shows the BEMF term as a feedback means. Another example of using the inherent characteristics of the device itself for speed feedback would be a hydraulic flow control valve where the opening of the valve determines the flow rate of the hydraulic fluid and hence the speed of the output prime mover such as a hydraulic cylinder or rotary hydraulic motor. A block diagram of such a hydraulic flow control valve and motor combination does show direct speed feedback within the components themselves.

An individual drive is provided for each desired motion, and thus power is delivered to the servo motor in close proximity to where the mechanical motion will be utilized. Line shafts and power takeoffs are eliminated providing for a smaller lighter machine. The smaller lighter machines will run faster and more efficiently. Fewer parts and easier change-over of the machine's operating characteristics is possible. Utilizing the teaching of the present invention new assembly machine or system design is possible. The constraints imposed by the large mechanical drive shaft are eliminated. By eliminating the main drive shaft the many safety guards required around the drive shaft and power take offs are also eliminated. This provides for a safer and more easily serviced machine.

At times it is desirable to change the relative position of the slave shaft with respect to the master shaft without changing the program in the memory device. This can be accomplished by a phasing control input supplied at an appropriate location. Input phasing is provided by altering the input to the memory device by an appropriate number of digital counts. Input phasing is equivalent to holding the slave shaft stationary while rotating the master shaft. A second type of phasing, output phasing is equivalent to holding the master shaft stationary while rotating the slave shaft. Output phasing is accomplished by adding an appropriate signal after the memory device. The input or output phasing signal can be a constant or a function of time or some other variable. Phasing adjustments allow a convenient method for adjusting the machine for initial set up or for process changes without the necessity of mechanical adjustments or alterations.

In one embodiment of the invention a master resolver is connected to sense position of the main drive motor. The information from the resolver is processed by a master encoder which yields a digital output signal. The digital output signal is fed to a plurality of individual memory devices, a programmable read only memory (PROM). The output of each PROM is fed to the associated translator which in conjunction with a servo control system and a servo motor positions an associated slave shaft. The position of the slave shaft is sensed by a slave resolver which feeds a signal to the transistor which provides an analog output error signal used for positioning the servo motor. The servo motor is driven to a position where the error signal is zero, indicating the slave shaft is at the desired relative position. A tachometer may be provided for speed control of the slave servo motor. Whenever the term resolver is used herein, in the specification or claims, it means resolver, synchro, differential transformer, control transformer or other sinusoidal position indicating device.

It is an object of this invention to teach an electronic profile generator which can independently position a plurality of mechanically independent slave shafts with respect to a master shaft position.

It is a further object of this invention to disclose a plurality of electronic motion generators operable in response to a changing digital input signal for positioning a plurality of independent shafts.

It is a still further object of this invention to teach input and output phasing control of a plurality of slave shafts synchronized with a master shaft through an associated electronic memory device.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENTS

Figure 1:
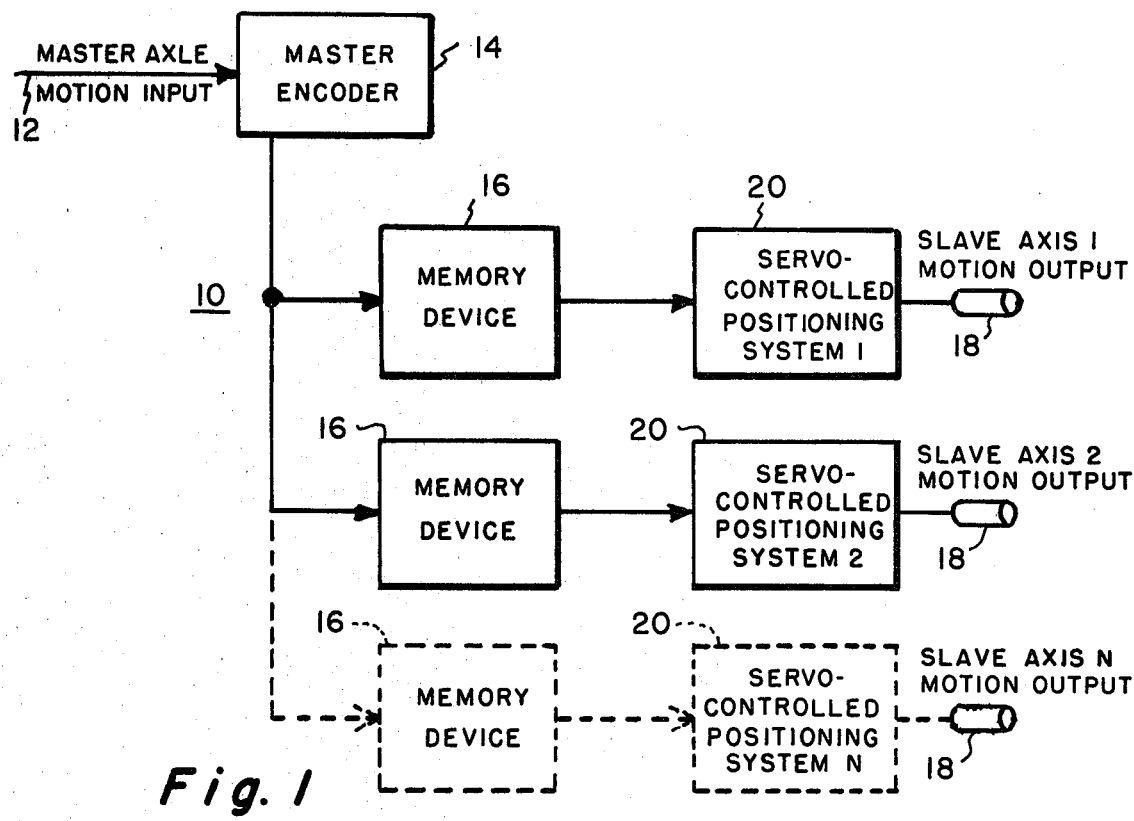
FIG. 1 is a block diagram of a machine profile drive control constructed in accordance with the teaching of the present invention.

Referring now to the drawings, and FIG. 1 in particular, there is shown the controls for a multi-axis profile generator 10 constructed in accordance with the teaching of the present invention. A master axis motion input 12 is provided to a master encoder 14. Master encoder 14 activates a plurality of memory devices 16, the outputs of which control servo positioning systems 20. Each servo controlled positioner 20 controls motion of a slave axis 18. Controller 10 provides for generating multi-axis intermittent motion by means of electronic encoder 14, memory 16 and servo controller 20. Position controller 10 provides for programmable motion of a plurality of slave axes 18 which are synchronized to a master axis motion input 12 by way of master encoder 14. The master axis encoder provides a digital output representative of the actual master axis position. The digital output is absolute and non-ambiguous.

The digital output is absolute, over one cycle of the memory device, since it will accurately provide a digital indication of the resolver shaft position even after a temporary power interruption. Some conventional absolute digital encoders utilize multiple gear discs in an arrangement wherein each disc is read by a light source and photo-cell arrangement. Experience has shown in many industrial applications that vibrations and handling of these type encoders has caused substantial maintenance and down time. Thus, in the preferred embodiment resolvers are utilized for position indication. It is to be understood, however, that other types of encoders can be used if desired. The encoder 14 in the preferred embodiment utilizes a resolver 40, which is of a relatively simple rugged construction for sensing master shaft position. In a preferred embodiment the tracking digital angle encoder, as described more fully in U.S. Pat. No. 3,984,831 issued Oct. 5, 1976 to Jones et al., is utilized to generate the master axis position in the form of a ten bit binary word. The master axis position word defines the master position of a resolution of $360°/2^{10}$ and divides the master axis shaft position into 1024 discreet increments over one revolution. Each increment represents approximately 0.35+°. The master axis position word is absolute and non-ambiguous over one complete revolution or cycle. The master axis position word is applied to a memory device, one device is required for each axis to be synchronized, and acts as an address for the memory device. Thus, a plurality of memory devices 16 are connected to the output of master encoder 14. The output of each memory device is a discrete stored command word for each input address. In one embodiment for a ten bit binary word there are 1024 stored commands in the memory device. The output of each memory device feeds a servo positioning system 20 as shown in FIG. 2.

Figure 2:
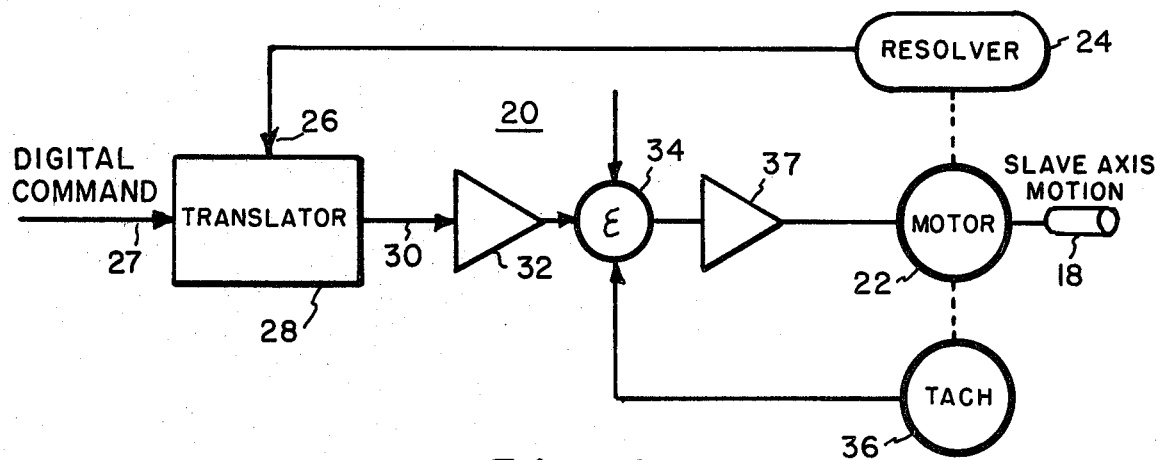
FIG. 2 is a block diagram of a servo controller operable in response to a digital command input.

FIG. 2 shows a servo controller wherein a servo motor 22 drives a slave axis 18. A resolver 24 is connected to the slave motor 22 and provides an analog indication of the position of servo motor 22 which is fed to the analog input 26 of translator 28. A digital command from memory device 16 is fed to the digital input 27 of translator 28. The output of translator 28 along line 30 is an analog signal representing the difference between the analog input 26 and the digital input 27. The signal along line 30 is strengthened by amplifier 32 and summed at junction 34 with a signal from a tachometer 36. Tachometer 36, which is connected to servo motor 22, provides a signal indicative of servo motor 22 velocity. The combined tachometer and error signal from the output of junction 34 is amplified by amplifier 37 and fed to servo motor 22. In operation servo 20 tends to move to a position where the error signal along line 30 is zero and slave axis 18 is at the desired position indicated by the digital command from memory device 16. A positioning servo which is suitable for operation is disclosed in copending application No. 539,265.

Figure 5:
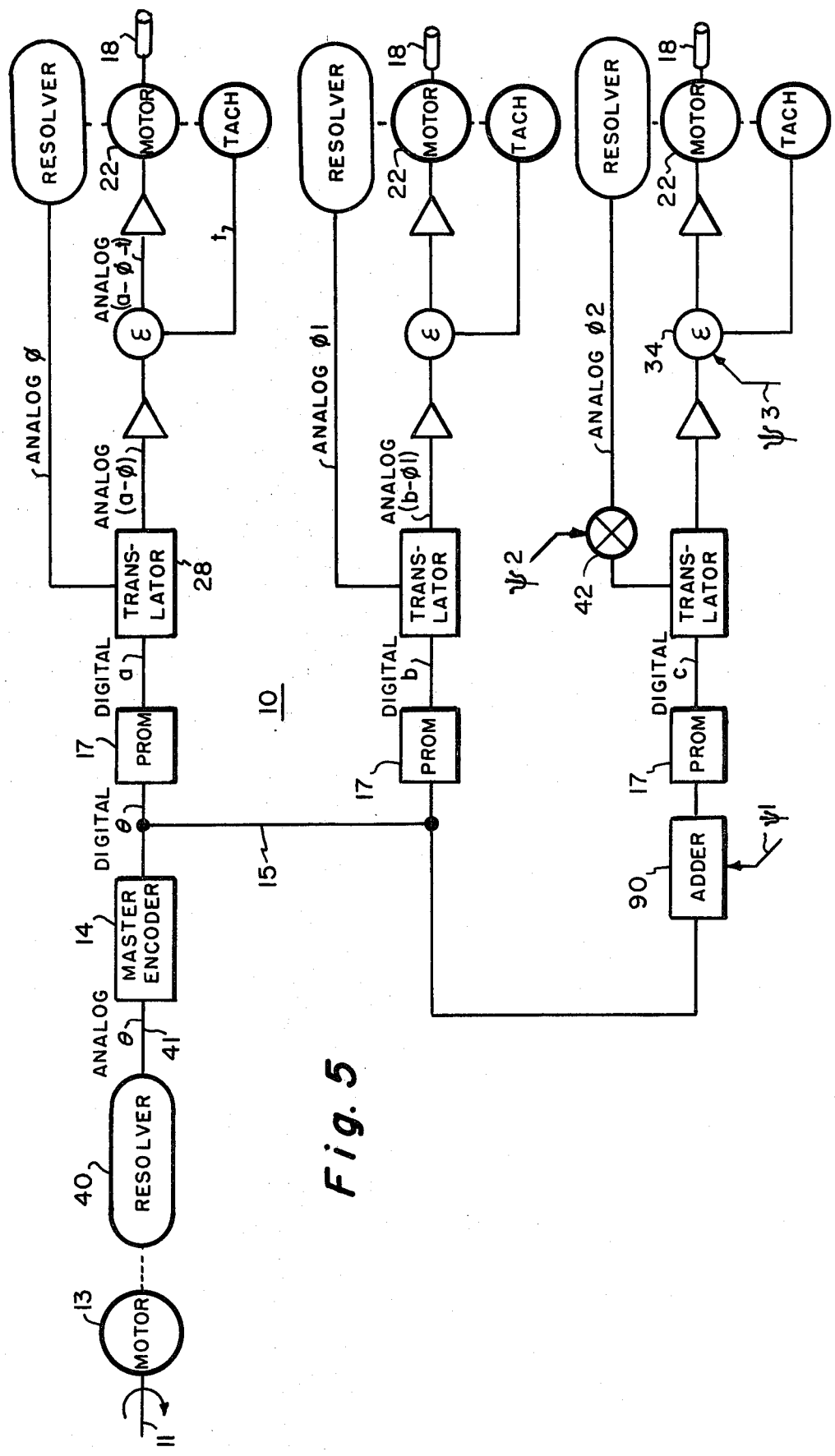

Referring now to FIG. 5 there is shown a more detailed block diagram of a servo controller 10 for controlling a plurality of slave axis 18 in response to the position of a master axis 11. A master resolver 40, is connected to master motor 13, and provides an analog signal along lines 41 indicative of the position of master shaft 11. Resolvers 40 are relatively rugged and provide a high degree of accuracy for determining the position of master axis 11. The analog signal along line 41 is fed to master encoder 14 which provides a digital signal along line 15 to a plurality of memory devices 17. Memory devices 17 can be a programmable read only memory (PROM). The output is a digital signal which is fed to the digital input of translator 28. A PROM 17 is provided for each slave axis 18. Each PROM 17 has an output which is independent of the output of the other PROMs 17 and is determined by the digital input along line 15. The output of motor 22 is a motion which follows the profile stored in memory device 17 and follows the profile synchronized with the master axis position.

In some applications there is no requirement for a master axis. In these cases a virtual master is provided by a digital counter which operates from a variable adjustable clock frequency and sequentially scans the memory devices. By this means the slave axes are synchronized through the master and run at a speed set by the clock frequency.

By utilizing the disclosed technique the power output is provided where needed, rather than taken off a drive shaft, as in prior art mechanical systems. This generates a whole new concept in machine tool design. A Cam profile can be stored in memory and changed when necessary. As many slaves as desired can be synchronized with the positioning of the master axis. The positioning constraints of the prior art mechanical drives are eliminated. Flexibility and energy savings are provided by the disclosed positioning apparatus.

Figure 3:
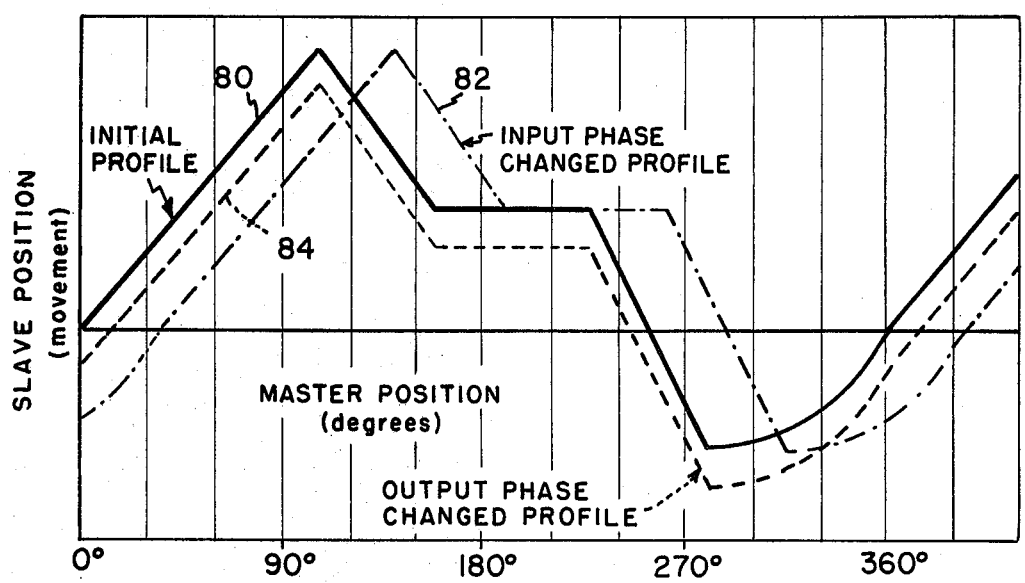
FIG. 3 is a graphic representation of a slave shaft profile illustrating input and output phase changes to the profile.

Referring now to FIG. 3 there is shown a profile 80 for a slave motion drive as a function of the master position input. The profile 80 shows various slave movements as a function of the master position. The master axis position is expressed in degrees and the slave shaft position shows a relative displcaement. The performance of the disclosed profile generator 10 can be enhanced by additional controls which allow the slave relationship of the individual slave axes to be varied with respect to the master shaft position. The relationship can be varied either by a constant or by a function of some variable. Phase control can be either input phase control, wherein a selected phase changing signal is added before the memory device, or output phase control, wherein phase changing signal is added after the memory device.

Input phasing is equivalent to holding the slave shaft stationary while rotating the master shaft. Input phasing can be accomplished by a digital adder circuit 90, as shown in FIG. 5, which allows the addition of a signal $\psi 1$ to the input PROM 17. Input phasing signal $\psi 1$ is applied to an input 41 of adder 90. The signal $\psi 1$ can be a constant or a variable. Graph 82 in FIG. 3 illustrates an input phase change by a constant. Note that the initial motion profile 80 is shifted along the master position axis to position 82. Adder 90 adds a selected digital signal to the output of master encoder 14 before it is fed to the associated memory device 17.

Output phasing control is equivalent to holding the master shaft stationary while rotating the slave shaft. Output phasing can be accomplished by adding a signal after the output of memory device 17. For example, in the lower portion of FIG. 5 output phasing signals $\psi 2$ or $\psi 3$ can be introduced as indicated. Output phasing signal $\psi 2$ can be introduced by a differential transducer 42 in series with the output position feedback. Likewise, an analog signal $\psi 3$ can be added to the error signal at summing junction 34 to accomplish the desired output phase shift. Output phasing can also be accomplished by an additional adder provided at the output of a PROM 17 for summing a digital output phasing signal.

Referring now to FIG. 3, graph 84 illustrates a slave position phase shift by a constant. Initial position profile 80 is shifted along the slave position axis by output phasing. It can thus be seen that input phasing shifts the initial profile along the master position axis while output phasing shifts the initial profile along the slave position axes. This type of phasing adjustments allows for a convenient method to adjust the machine for initial setup or process changes without the necessity of mechanical adjustment alterations, or reprogramming of the associated memory device.

Figure 4:
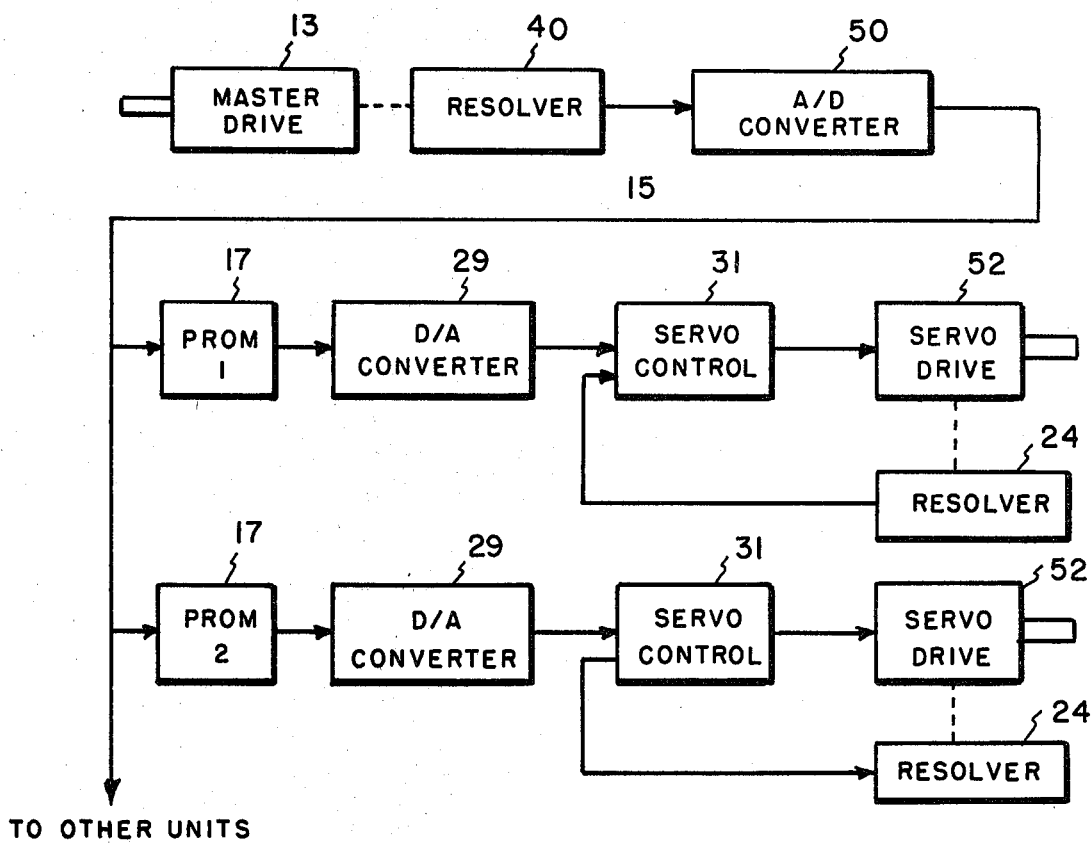
FIG. 4 is a block diagram of a multi-axis motion generator constructed in accordance with the teaching of the present invention; and, FIG. 5 is a block diagram of another embodiment of the invention showing a multi-step motion generator.

Referring now to FIG. 4 there is shown another embodiment of the present invention. The construction shown in FIG. 4 is similar to FIG. 5 but utilizes a digital-to-analog converter 29 and servo controller 31 rather than translator 28. Master drive motor 13 has a resolver 40 connected thereto which feeds A/D converter 50. The output of A/D converter 50 is a digital signal which is sent along line 15 to the various PROMs 17. The output of each PROM 17 is a digital memory signal indicative of a slave shaft position. The digital output of the PROM 17 provides the input to an associated D/A converter 29 which provides an analog output to servo controller 31. Servo controller 31 drives servo drive 52 to the desired position. A resolver 24 providing position feedback information can be utilized to enhance system control. Velocity feedback in this embodiment can also be provided, if desired.

What is claimed is:

1. Position control apparatus for positioning a plurality of movable members comprising:
    a master control shaft;
    a resolver connected to said master control shaft providing an analog signal output representing the absolute position of said master control shaft;
    an analog-to-digital converter connected to said resolver output providing a digital signal equivalent of the position of said master control shaft;
    a plurality of memory devices each connected to said analog-to-digital converter and each independently programmed to provide simultaneously an individual digital output which is addressed by the digital signal from said analog-to-digital converter; and,
    positioning means associated with each memory device for positioning one of the plurality of movable members at a position determined by the individual digital output of the associated memory device so that the plurality of movable members are simultaneously positioned in response to the sequentially changing digital signal.

2. Position control apparatus for positioning a plurality of movable members comprising:
    a master control shaft rotatable through a plurality of revolutions;
    an encoder connected to said master control shaft providing a sequentially changing digital signal representation of the position of said master control shaft;
    a plurality of memory devices each connected to said analog-to-digital converter and each independently programmed to provide simultaneously an individual digital output which is addressed by the digital signal from said analog-to-digital converter; and,
    positioning means associated with each memory device for positioning one of the plurality of movable members at a position determined by the indivdiual digital output of the associated memory device so that the plurality of movable members are simultaneously positioned in response to the sequentially changing digital signal.

3. Position control apparatus as claimed in claim 2 wherein said positioning means comprises:
    a digital-to-analog converter associated with each of said plurality of memory devices providing an analog signal representation of the desired movable member position with respect to the master digital signal; and,
    servo drive means associated with each digital-to-analog converter for driving the associated movable member to the desired position in response to the analog signal from said digital-to-analog converter.

4. Position control apparatus as claimed in claim 2 werein each of said positioning means comprises:
    a slave shaft;
    a translator having a digital input connected to an associated memory device, an analog input, and an analog output representing the difference between the digital input and the analog input;
    a servo drive means driven in response to the output of said translator for driving said slave shaft; and
    a resolver connected to the slave shaft driven by the associated servo motor providing an analog signal, which is fed to the analog input of the translator, representing the position of the associated slave shaft.

5. Position control apparatus as claimed in claim 4 comprising:
    a tachometer associated with each servo drive for providing an analog output indicating the speed of the associated servo drive; and
    said positioning means being connected to combine the analog speed output signal from said tachometer with the analog signal from the output of said translator.

6. A positioning system for independently positioning a plurality of slave shafts in response to the position of a rotatable master shaft comprising:
    an encoder for providing a digital output signal representative of the master shaft position;
    a plurality of digital memory devices, each of which can be independently programmed, connected to be addressed by the digital output signal of said encoder, each associated with at least one of the slave shafts and each providing simultaneously a digital output signal representative of the desired position of the associated slave shaft with respect to the master shaft position;
    digital-to-analog converter means associated with each of said plurality of digital memory devices providing an analog signal representative of the desired slave shaft position with respect to the master shaft position; and,
    drive means associated with each digital-to-analog converter for driving the associated slave shaft to the desired position in response to the analog signal from said digital-to-analog converter means for simultaneous positioning of the plurality of slave shafts.

7. A positioning system as claimed in claim 6 wherein:
    each of said plurality of digital memory devices comprises a programmable read only memory.

8. A positioning system as claimed in claim 6 wherein said encoder comprises:
    an analog transducer for sensing the master shaft position and providing an analog output signal representative of the master shaft position; and,
    an analog-to-digital converter connected to said analog transducer providing a digital output signal representative of the master shaft position.

9. A positioning system as claimed in claim 6 wherein said drive means comprises:
    a drive motor for driving the associated slave shaft;
    a resolver connected to the associated slave shaft for providing an analog position signal representative of the associated slave shaft position; and,
    velocity feedback means for driving a slave shaft velocity signal connected to each slave shaft and providing a speed feedback signal in the associated drive means.

10. A positioning system as claimed in claim 9 wherein said velocity feedback means comprises a tachometer.

11. Apparatus for positioning a plurality of output shafts in response to the position of a master shaft rotatable through a plurality of revolutions comprising:
    a resolver connected to the master shaft providing an analog electrical output indicative of the position of the master shaft;

an encoder having an input connected to the output of said resolver and an output providing a signal in digital form corresponding to the analog input;

a plurality of independently programmed memory devices each having an input connected to the output of said encoder and having an output which provides an individual digital position signal from memory according to the digital input from said encoder;

a translator associated with each memory device having a digital input, connected to said memory device output, an analog input, and an analog output providing the algebraic difference between the signals on said digital input and said analog input;

amplifier means connected to the output of each translator for amplifying the output signal of said translator;

a servo motor connected to be driven by the output of each amplifier means to rotate one of the plurality of output shafts to the position indicated by the output of the associated memory device; and, a slave resolver connected to the associated output slave shaft providing an analog signal representative of the position of the associated output slave shaft, to the analog input of said translator.

12. Apparatus as claimed in claim 11 comprising:
signal input means for feeding a phase control signal into a connection before said memory device.

13. Apparatus as claimed in claim 11 comprising:
signal input means connected after the output of said memory device for providing a phase control signal.

14. Apparatus as claimed in claim 11 comprising:
velocity feedback means connected to each output shaft for providing a velocity feedback signal.

15. A machine for positioning a plurality of mechanically independent motion output devices comprising:
master digital signal means for providing a sequentially changing digital signal;

a plurality of memory devices having inputs connected to said master digital signal means and each simultaneously providing in response to the digital address from said master digital signal means a stored digital signal output representative of the desired position of an associated output device;

a digital-to-analog converter connected to the output of each memory device and providing an analog positioning signal related to the digital output signal from said associated memory device;

drive means associated with each digital-to-analog converter for positioning an associated output device in accordance with the analog output of the associated digital-to-analog converter;

input phase control means disposed before an associated memory device for altering the digital input to said memory device; and, output phase control means disposed after an associated memory device for altering the analog input to said associated drive means.

16. Position control apparatus for positioning a plurality of movable members comprising:
master digital signal means for providing a sequentially changing digital signal;

a plurality of memory devices each connected to said master digital signal means output and each independently programmed to provide simultaneously an individual digital output and each of which is addressed by the digital input signal from said master digital signal means;

a drive motor associated with each memory device for positioning an associated movable member at a position determined by the individual digital output of the associated memory device so that the plurality of movable members are simultaneously positioned in response to the sequentially changing digital signal;

an analog transducer connected to the associated movable member for providing an analog position signal representative of the associated movable member position; and, a translator having a first input connected to the analog transducer, which provides the associated movable member position, and a second input, connected to receive the digital position output signal from the associated memory device representative of the desired movable member position, and providing an analog output, representing the difference between the positions represented by the signals on the first and second inputs.

17. Position control apparatus as claimed in claim 16 comprising:
feedback for providing a feedback signal from each drive motor for controlling said drive motor.

18. Positioning control apparatus as claimed in claim 17 wherein:
said feedback means comprises a tachometer.

19. Position control apparatus for positioning a plurality of movable members comprising:
master digital signal means for providing a sequentially changing digital signal;

a plurality of memory devices connected to said master digital signal means output and each independently programmed to provide simultaneously an individual digital output which is addressed by the digital input signal from said master digital signal means;

a slave shaft associated with each memory device;

drive means associated with each memory device for driving the associated slave shaft to a position determined by the individual output of the associated memory device so that the plurality of movable members are simultaneously positioned in response to the sequentially changing digital signal;

an analog transducer connected to the associated slave shaft for providing an analog position signal representative of the associated slave shaft position;

a translator having a first input connected to said analog transducer and a second input connected to said associated memory device providing an analog output representative of the difference between the position represented by the output of said analog transducer and the position represented by the output of said associated memory device; and, phase positioning control means for changing the phase relationship between the master digital signal and the associated slave shaft.

20. Position control apparatus as claimed in claim 19 wherein said phase position control means comprises:
a digital adder connected to the input of the memory device for altering the digital signal from the master digital signal means.

21. Position control apparatus as claimed in claim 19 wherein said phase positioning means comprises:
signal input means associated after said associated memory device for providing an input signal.

* * * * *

UNITED STATES PATENT AND TRADEMARK OFFICE
CERTIFICATE OF CORRECTION

PATENT NO. : 4,084,083
DATED : April 11, 1978
INVENTOR(S) : Paul F. McNally and Robert G. Burig It is certified that error appears in the above-identified patent and that said Letters Patent are hereby corrected as shown below:

Column 1, line 51, "indicator" should read --indication--.

Column 3, line 53, "transistor" should read --translator--.

Claim 17, line 3, after "feedback" first occurrence, --means-- should be added.

Signed and Sealed this

Fifth Day of September 1978

[SEAL]

Attest:

RUTH C. MASON
Attesting Officer

DONALD W. BANNER
Commissioner of Patents and Trademarks